United States Patent
Gallery et al.

(10) Patent No.: US 11,754,372 B2
(45) Date of Patent: Sep. 12, 2023

(54) SYSTEMS AND METHODS FOR SHOOTING SIMULATION AND TRAINING

(71) Applicant: HVRT CORP., Orofino, ID (US)

(72) Inventors: Nathaniel P. Gallery, Lewiston, ID (US); Klaus Johnson, Orofino, ID (US); Andrew McCormick, Seattle, WA (US)

(73) Assignee: HVRT CORP., Orofino, ID (US)

( * ) Notice: Subject to any disclaimer, the term of this patent is extended or adjusted under 35 U.S.C. 154(b) by 55 days.

(21) Appl. No.: 17/020,632

(22) Filed: Sep. 14, 2020

(65) Prior Publication Data

US 2020/0408490 A1 Dec. 31, 2020

Related U.S. Application Data

(63) Continuation of application No. 16/227,629, filed on Dec. 20, 2018, now Pat. No. 10,788,290.

(60) Provisional application No. 62/726,633, filed on Sep. 4, 2018, provisional application No. 62/620,246, filed on Jan. 22, 2018.

(51) Int. Cl.
*F41G 3/26* (2006.01)
*F41A 33/00* (2006.01)

(52) U.S. Cl.
CPC ............ *F41G 3/2611* (2013.01); *F41A 33/00* (2013.01); *F41G 3/2694* (2013.01)

(58) Field of Classification Search
CPC ....... F41G 3/2611; F41G 33/00; F41G 3/2694
USPC .......................................................... 434/20
See application file for complete search history.

(56) References Cited

U.S. PATENT DOCUMENTS

| | | | |
|---|---|---|---|
| 5,641,288 A * | 6/1997 | Zaenglein, Jr. | F41G 3/2633 434/21 |
| 5,686,690 A | 11/1997 | Lougheed et al. | |
| 5,920,995 A | 7/1999 | Sammut et al. | |
| 6,032,374 A | 3/2000 | Sammut et al. | |
| 6,453,595 B1 | 9/2002 | Sammut et al. | |
| 6,516,699 B2 | 2/2003 | Sammut et al. | |
| 6,681,512 B2 | 1/2004 | Sammut et al. | |
| 7,712,225 B2 | 5/2010 | Sammut et al. | |
| 7,832,137 B2 | 11/2010 | Sammut et al. | |
| 7,856,750 B2 | 12/2010 | Sammut et al. | |
| 7,937,878 B2 | 5/2011 | Sammut et al. | |
| 7,946,048 B1 | 5/2011 | Sammut et al. | |
| 8,109,029 B1 | 2/2012 | Sammut et al. | |
| 8,230,635 B2 | 7/2012 | Sammut et al. | |
| 8,353,454 B2 | 1/2013 | Sammut et al. | |
| 8,656,630 B2 | 4/2014 | Sammut et al. | |
| 8,707,608 B2 | 4/2014 | Sammut et al. | |
| 8,893,971 B1 | 11/2014 | Sammut et al. | |

(Continued)

FOREIGN PATENT DOCUMENTS

WO WO 2019144088 7/2019

OTHER PUBLICATIONS

Davis, American Rifleman, Mar. 1989, 1 page.

(Continued)

*Primary Examiner* — Robert P Bullington
(74) *Attorney, Agent, or Firm* — CASIMIR JONES S.C.; Kirk Hogan

(57) ABSTRACT

Provided herein are systems and methods for shooting simulation of a target with a projectile. More particularly, the invention relates to virtual reality optical projection systems to monitor and simulate shooting.

18 Claims, 12 Drawing Sheets

Horus VR Trainer Architecture Diagram

(56) References Cited

U.S. PATENT DOCUMENTS

| | | |
|---|---|---|
| 8,905,307 B2 | 12/2014 | Sammut et al. |
| 8,959,824 B2 | 2/2015 | Sammut et al. |
| 8,966,806 B2 | 3/2015 | Sammut et al. |
| 8,991,702 B1 | 3/2015 | Sammut et al. |
| 9,068,794 B1 | 6/2015 | Sammut |
| 9,250,038 B2 | 2/2016 | Sammut et al. |
| 9,255,771 B2 | 2/2016 | Sammut et al. |
| 9,335,123 B2 | 5/2016 | Sammut |
| 9,459,077 B2 | 10/2016 | Sammut et al. |
| 9,500,444 B2 | 11/2016 | Sammut et al. |
| 9,574,850 B2 | 2/2017 | Sammut et al. |
| 9,612,086 B2 | 4/2017 | Sammut et al. |
| 9,869,530 B2 | 1/2018 | Sammut et al. |
| 10,788,290 B2 | 9/2020 | Gallery et al. |
| 2002/0197584 A1 | 12/2002 | Kendir et al. |
| 2009/0155747 A1 | 6/2009 | Cornett et al. |
| 2011/0207089 A1 | 8/2011 | Lagettie et al. |
| 2012/0097741 A1 | 4/2012 | Karcher |
| 2013/0040268 A1 | 2/2013 | Van Der Walt et al. |
| 2013/0288205 A1 | 10/2013 | Lupher et al. |
| 2014/0038136 A1 | 2/2014 | Hamilton et al. |
| 2014/0360081 A1 | 12/2014 | Lupher et al. |
| 2015/0276349 A1 | 10/2015 | Northrup et al. |

OTHER PUBLICATIONS

International Search Report and Written Opinion for PCT/US2019/014460, dated Mar. 27, 2019, 9 pages.
Extended EP Search Report issued in corresponding application No. 19740752.1, dated Sep. 17, 2021, 10 pages.

\* cited by examiner

FIG. 5

Horus VR Training Curriculum

Phase Zero (prior knowledge)

Basic Rifle Marksmanship
- steady position
- aim
- breath control
- trigger squeeze

Phase 1

Scoped Rifle Basics
- drop
- deflection (wind)
- lead (moving target)
- spin drift
- coriolis effect

Phase 2

Atmospherics
- relative humidity
- altitude
- barometric pressure
- temperature

Advanced Spotter
- wind speed estimation
- target speed estimation
- target size estimation

Advanced Wind
- variable wind speed
- variable wind direction
- wind vector calculation

Intelligent Targets
- respond to threats
- attack friendly targets
- attack the user
- communicate

Electronic Hardware
- weather meter
- wind meter
- LRF
- Solver app

Advanced Optics
- milling (range estimation)
- 2nd shot correction

Moving Targets
- time of flight

High-Angle Shooting

Phase 3

Multi-Skill Training
- sniping without any electronics
- rapid engagement
- hunting
- high wind + changing weather
- truing

Phase 4

Fully-Integrated Scenarios
- real-world locations (+ urban)
- real-world weather
- enemy combatants
- mission planning

SYSTEMS AND METHODS FOR SHOOTING SIMULATION AND TRAINING

The present application is a continuation of U.S. patent application Ser. No. 16/227,629, filed Dec. 20, 2018, which claims priority to U.S. Provisional Patent Application Ser. No. 62/620,246 filed Jan. 22, 2018, and to U.S. Provisional Patent Application Ser. No. 62/726,633 filed Sep. 4, 2018, each of which is incorporated by reference in its entirety herein.

FIELD

Provided herein are systems and methods for shooting simulation of a target with a projectile. More particularly, the invention relates to virtual reality optical and polysensory projection systems to monitor and simulate shooting.

BACKGROUND

Firearms, riflescopes, and ballistics calculators have continued to develop and provide complex shooting options for shooters. The diversity of different shooting systems and the numerous shooting parameters available using any one system has both expanded the ability of shooters to hit targets and have complicated the process. What is needed are systems and methods that allow shooters to develop and tests such systems and to train with these systems to gain maximal proficiency.

SUMMARY

Provided herein are systems and methods for shooting simulation of a target with a projectile. More particularly, the invention relates to virtual reality optical and other sensory modality projection systems (e.g., auditory, haptic and somatosensory projection systems) to monitor and simulate shooting. These systems and methods are useful for training shooters, under a wide range of different shooting conditions, to optimally use their equipment. Additionally, these systems and methods are useful for developing, testing and training in shooting systems, including weapons, optical devices (e.g., riflescopes, spotting scopes, etc.), ballistics calculators, range finders, global positioning satellite (GPS) systems, weather meters, altimeters, thermometers, barometers, cant monitors, slope monitors and other shooting equipment or accessories.

The systems and methods find use for all types of shooters and shooting scenarios, including, but not limited to hunting, target shooting, recreational shooting, and combat and military uses.

In some embodiments, the virtual reality shooting simulation systems and methods provided herein anticipate the delay time between the shot and the impact, and account for a multitude of factors that influence projectile trajectory including, for example, information regarding external field conditions (e.g., date, time, temperature, relative humidity, target image resolution, barometric pressure, wind speed, wind direction, hemisphere, latitude, longitude, altitude), firearm information (e.g., rate and direction of barrel twist, internal barrel diameter, internal barrel caliber, and barrel length), projectile information (e.g., projectile weight, projectile diameter, projectile caliber, projectile cross-sectional density, one or more projectile ballistic coefficients (as used herein, "ballistic coefficient" is as exemplified by William Davis, American Rifleman, March, 1989, incorporated herein by reference), projectile configuration, propellant type, propellant amount, propellant potential force, primer, and muzzle velocity of the cartridge), target acquisition device and reticle information (e.g., type of reticle, power of magnification, first, second or fixed plane of function, distance between the target acquisition device and the barrel, the positional relation between the target acquisition device and the barrel, the range at which the telescopic gunsight was zeroed using a specific firearm and cartridge), information regarding the shooter (e.g., the shooter's visual acuity, visual idiosyncrasies, heart rate and rhythm, respiratory rate, blood oxygen saturation, muscle activity, brain wave activity, and number and positional coordinates of spotters assisting the shooter), and the relation between the shooter and target (e.g., the distance between the shooter and target, the speed and direction of movement of the target relative to the shooter, or shooter relative to the target (e.g., where the shooter is in a moving vehicle), the Coriolis force, the direction from true North, and the angle of the rifle barrel with respect to a line drawn perpendicularly to the force of gravity).

In some embodiments, provided herein are virtual reality systems and methods comprising: a controller (e.g., firearm-shaped controller, firearm, etc.), comprising: i) a frame (e.g., comprising the shape of a firearm and, optionally, the shape of a target acquisition device, such as a riflescope); and ii) position sensors; b) a user headset comprising at least one visual interface or viewer displaying a shooter view (e.g., riflescope view displaying a reticle pattern), and optionally at least one auditory, haptic or somatosensory interface; c) a computer component comprising a processor; and d) non-transitory computer readable media comprising instructions that when executed by said processor cause the computer to execute a shooting simulation projected to the user's headset. In some embodiments, a bullet flight path is displayed to the user. In some embodiments, the bullet flight path incorporates simulated flight physics based on one or more, or all, of the factors that influence projectile trajectory discussed above. In some embodiments, the systems and methods further comprise a user interface that allows a user to select conditions, views, and settings. In some embodiments, the computer readable media comprises instructions that simulate multiple targets that train the shooter in progressively more complex shooting conditions and/or that run a series of protocols that train the shooter how to use, master, and intuit features of a shooting system component and/or external conditions (e.g., features of a reticle, shooting in different humidity conditions, different lighting, etc.).

In some embodiments, provided herein are methods for using such a simulated virtual reality shooting system comprising: inputting or selecting shooting conditions (e.g., external conditions, the firearm being used, the cartridge being used, the target acquisition device and reticle being used, the shooter, and the relation of the shooter and the target) and simulating one or more shooting scenarios. In some embodiments, shooting statistics, bullet paths, and other shooting data are collected and accessible by the user to evaluate shots, progress, and/or to score progress.

DESCRIPTION OF THE FIGURES

FIG. 3A in flight; and FIG. 3B impacting below and to the left of the target.

FIG. 5 shows an exemplary Virtual Reality (VR) Training Curriculum

DEFINITIONS

Figure 1:
FIG. 1 shows an exemplary headset view showing a weapon.
Figure 2:
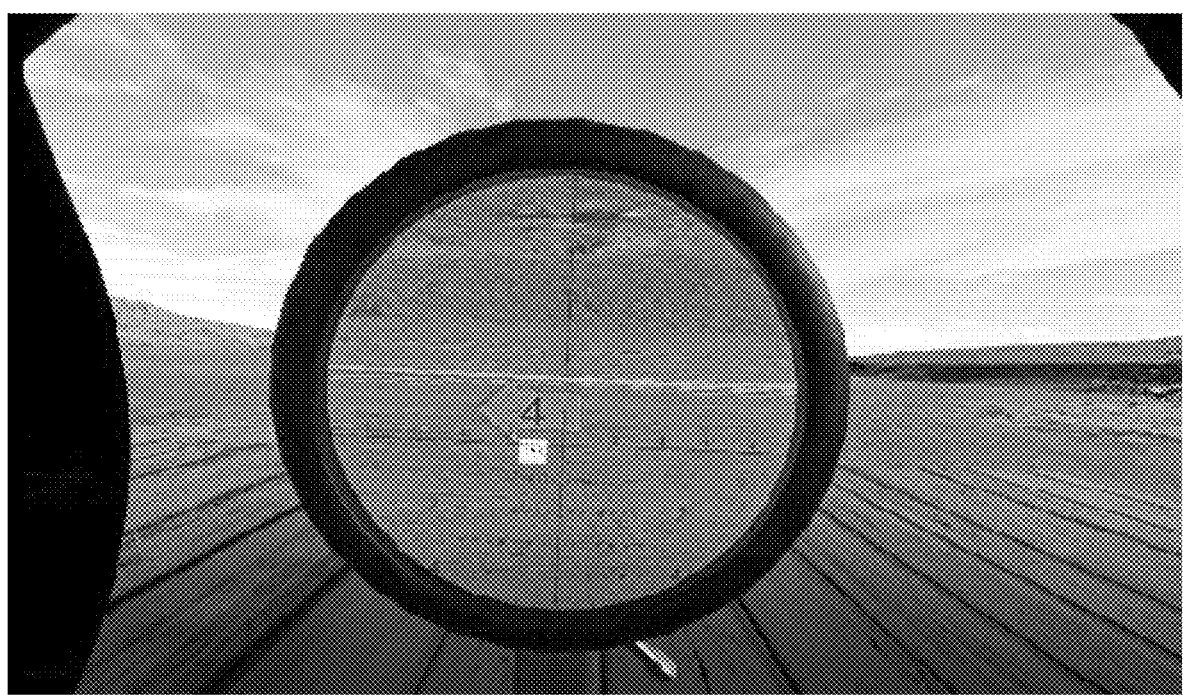
FIG. 2 shows an exemplary headset view showing a reticle pattern, target, and wind speed direction and force.
Figure 3A:
FIGS. 3A-3B show the view of FIG. 2 showing bullet path.
Figure 3B:
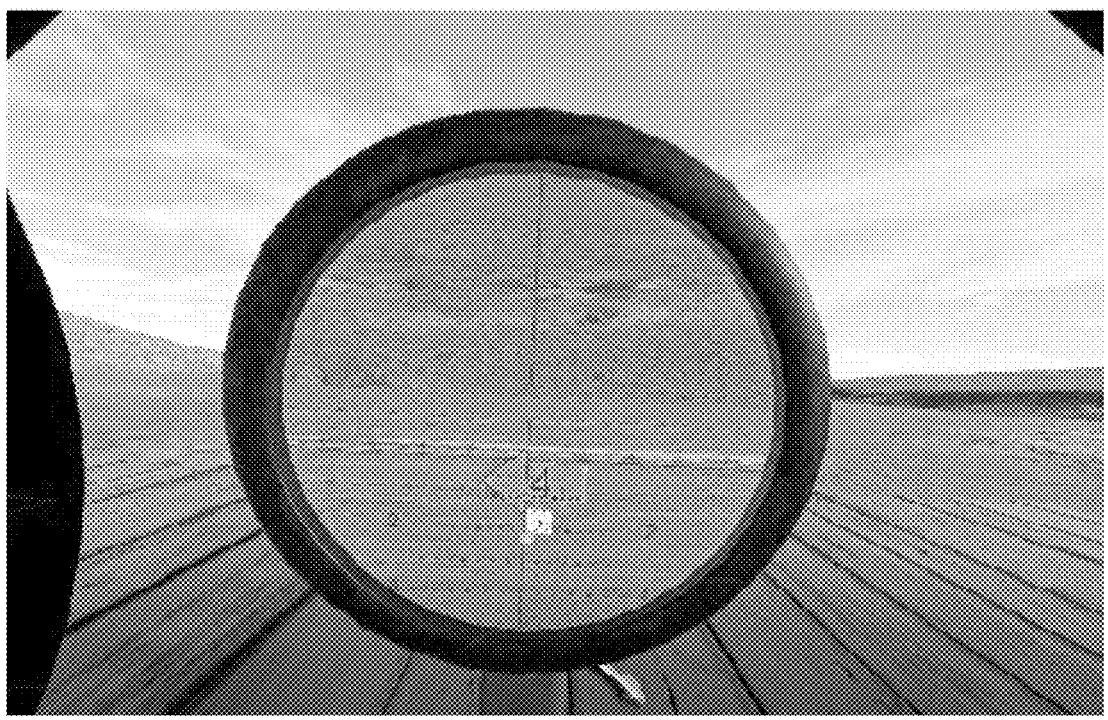

To facilitate an understanding of the present disclosure, a number of terms and phrases are defined below:

As used herein, the terms "computer memory" and "computer memory device" refer to any storage media readable by a computer processor. Examples of computer memory include, but are not limited to, random access memory (RAM), read-only memory (ROM), computer chips, digital video disc (DVDs), compact discs (CDs), hard disk drives (HDD), and magnetic tape.

As used herein, the term "computer readable medium" refers to any device or system for storing and providing information (e.g., data and instructions) to a computer processor. Examples of computer readable media include, but are not limited to, DVDs, CDs, hard disk drives, memory chip, magnetic tape and servers for streaming media over networks. A computer program is, in some embodiments, embodied on a tangible computer-readable medium, and sometimes is tangibly embodied on a non-transitory computer-readable medium.

As used herein, the terms "processor" and "central processing unit" or "CPU" are used interchangeably and refer to a device that is able to read a program from a computer memory (e.g., ROM) or other computer memory) and perform a set of steps according to the program.

DETAILED DESCRIPTION

Provided herein are systems and methods for shooting simulation. More particularly, the invention relates to virtual reality optical and other sensory modality projection systems to monitor and simulate rifle shooting. In particular, provided herein are systems and methods for shooting simulation comprising a controller, a viewer, and a computer.

The controller can be any type of controller. In preferred embodiments, the controller has the shape or form of a firearm or other shooting device. The controller can be a firearm game controller, a number of which are commercially available. In some embodiments, the controller is an actual firearm. In certain embodiments, the firearm comprises a telescopic gunsight or target acquisition device. In some embodiments, the controller comprises one or more sensors in communication with the computer that convey the positions of the controller relative to a user and in 3-dimensional space. When the controller is a real firearm, the sensor may be attached to one or more locations on or in the firearm. In some embodiments, the controller comprises a trigger, button, or other actuator that when pressed, pulled, or otherwise actuated by a user, indicates to the computer that a shot has been made.

The viewer is any type of viewer that projects a simulated image (e.g., landscape comprising a target) to a user. In some embodiments, the viewer is a virtual reality headset. In some embodiments, the viewer comprises a headset comprising one or more of a processor, a power source connected to the processor, memory connected to the processor, a communication interface connected to processor, a display unit connected to the processor, and sensors connected to processor. In certain embodiments, the viewer is a virtual reality unit, for example, an Oculus Rift headset available from Oculus VR, LLC. In another embodiment, the virtual reality unit is the HTC Vive headset available from HTC Corporation. In this embodiment, a set of laser position sensors is attached to an external surface of a virtual reality unit to provide position data of the virtual reality unit. Any suitable virtual reality unit known in the art may be employed. Other exemplary embodiments include hardware comprising an Intel Core i5-4590 or AMD FX 8350 processor equivalent or better, a NVIDIA GeForce GTX 1060 or AMD Radeon Rx 480 graphics card or better, 4 GB of RAM or better, a 1× HDMI 1.4 port or DiplayPort 1.2 or better, USB 1×USB 2.0 port or better, and a Windows 7 SP1, Windows 8.1, Windows 10 or better operating system. In other embodiments, the viewer is a display device that may be removably attached to a target acquisition device, and that displays data and images that are superimposed over real world images. In certain embodiments, the viewer is physically or electronically integrated with a target acquisition device. In particular embodiments, the viewer superimposes a computer-generated image on a user's view of the real world as seen, for example, through a target acquisition device, thereby providing a composite view of the real world augmented by computer-generated data and/or one or more images. In further embodiments, the composite view of the real world is augmented by computer-generated data and/or one for more images is further augmented by additional computer-generated perceptual information including visual, auditory, haptic, somatosensory, and/or olfactory information. In still further embodiments, the computer-generated perceptual information comprises information from and to multiple sensory modalities.

The computer comprises a processor and is configured to run software that communicates with the controller and the viewer. The computer may be contained in the controller or the viewer. Communication may be wired or wireless.

In use, a generated target is simulated. The controller, held by a user, is tracked to generate a ballistics solution displayed on the viewer at a lead distance and an elevation from the target as viewed through the viewer. The computer determines a hit or a miss of a shot directed at a target using the position of the controller and a ballistic solution that accounts for the selected shooting conditions (e.g., user-selected conditions). In some embodiments, a simulated bullet flight path is generated and displayed in the viewer overlaid onto the shooting landscape displayed on the viewer.

Figure 4A:
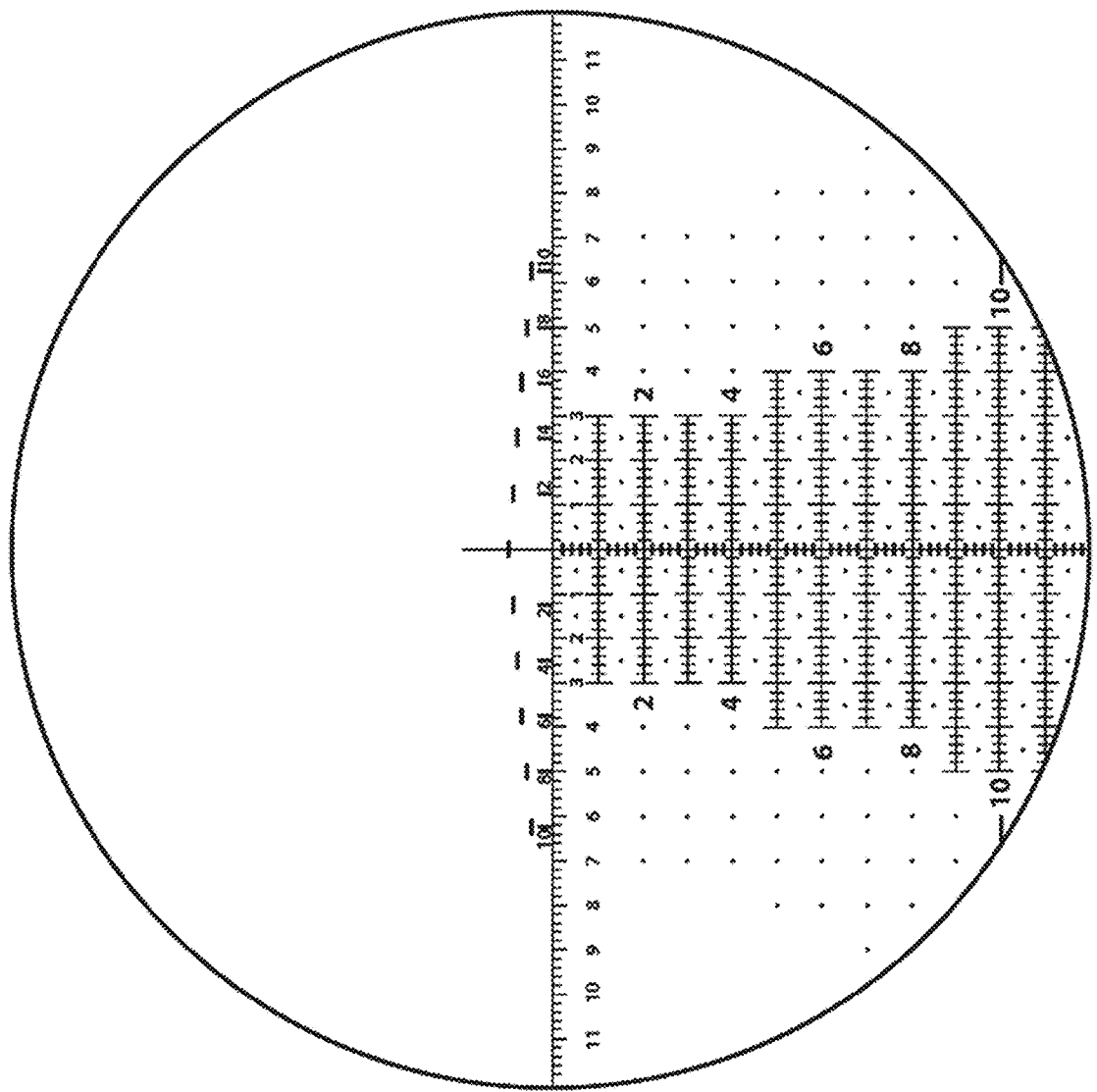
FIGS. 4A-4C show exemplary Horus Vision (HVRT) H59 (FIG. 4A), TREMOR2 (FIG. 4B and TREMOR3 (FIG. 4C) reticle patterns.
Figure 4B:
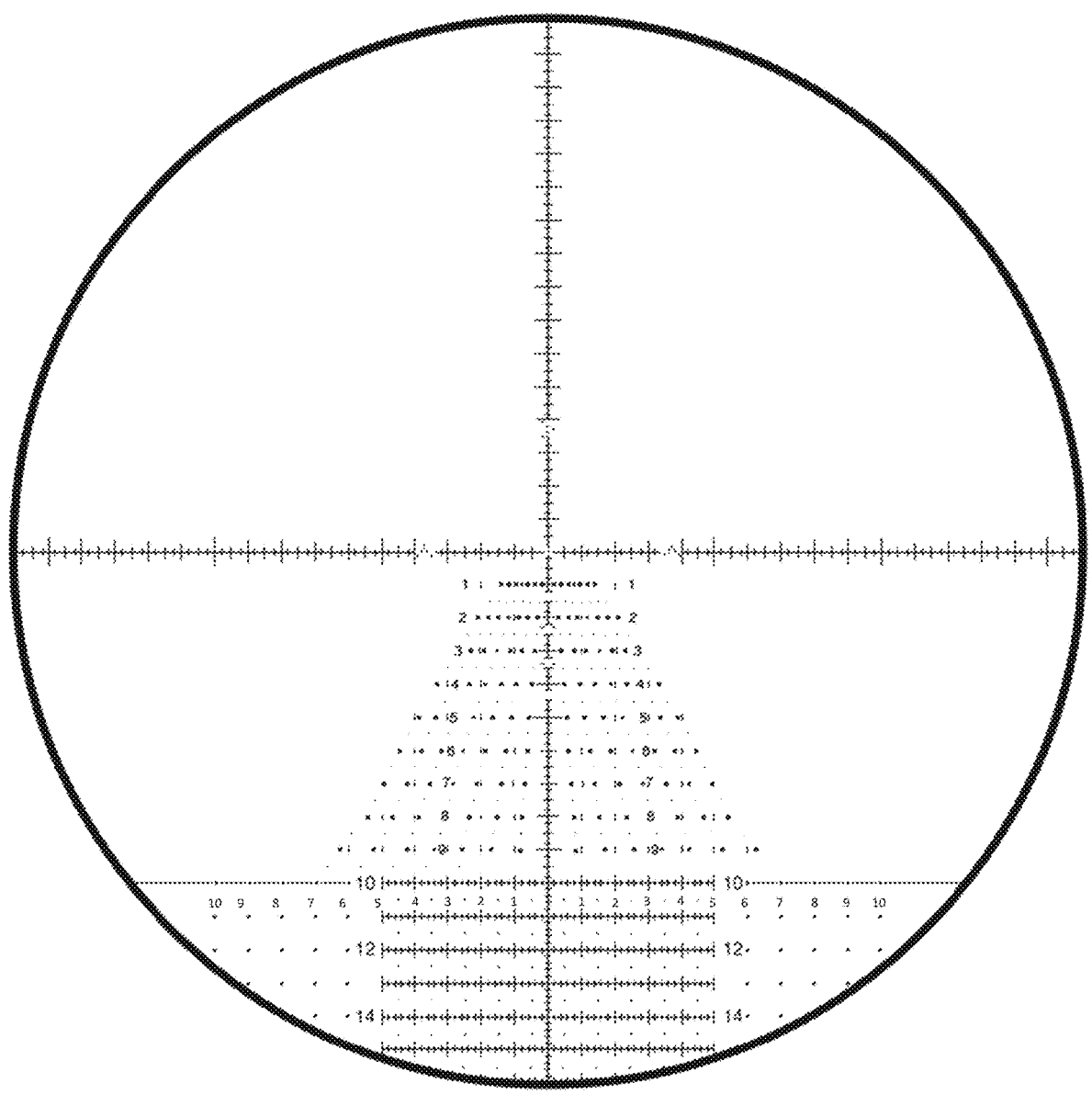

In some embodiments, a target is simulated as seen, for example, through a target acquisition device comprising a reticle. In some embodiments, the reticle comprises a pattern designed for long range shooting with markings that assist a shooter in accurately hitting long range and/or moving targets under a range of different shooting conditions (e.g., environmental conditions). Such reticles include, but are not limited to, Horus Vision (HVRT) reticles such as the H58/59 reticles and TREMOR reticles (see e.g., FIG. 4) (see e.g., U.S. Pat. Nos. 9,574,850 and 9,612,086, herein incorporated by reference in their entireties). In certain embodiments, a TREMOR reticle comprises a grid. In other embodiments, a TREMOR reticle comprises rapid range bars above a primary horizontal cross-hair or stadia. In further embodiments, a TREMOR reticle comprises one or more ranging chevrons for vertical and horizontal ranging, comprising, for example, a 0.1 Mil spacing chevron. In particular embodiments, a TREMOR reticle comprises moving target hold markings above the primary horizontal cross-hair. The moving target hold markings or reference points may, on some embodiments, be calculated in even miles per hour increments, and approximate the ballistic profile of 7.62×51 or 0.308 projectiles and rifles to, or example, 300 meters. In given embodiments, a horizontal cross-hair or stadia comprises standard mil-radian graduation markings of use, for example, as conventional lead hold markings. In still further embodiments, a TREMOR reticle comprises numerical lead holds above the primary horizontal cross-hair. In certain embodiments, a TREMOR reticle comprises one or more illuminated aiming points, and/or projected aiming points that correspond to one or more ballistics calculator aiming solutions.

In some embodiments gloves with sensors are worn by a user. The sensor may monitor finger movement (e.g., to provide an actuation for the shot), biosensor information about the shooter (e.g., hand position, heart rate, electromyogram, electrocardiogram, etc.), or other desired information and may provide tactile (e.g., vibratory, gyroscopic resistance, firearm recoil, etc.) or other feedback to the user.

In some embodiments, the systems and methods are implemented in hardware or software (including firmware, resident software, micro-code, etc.), or in combined software and hardware, for example as a "circuit," "module," "component," or "system." In certain embodiments, aspects of the invention are provided in the form of a computer program product embodied in one or more computer readable media having computer readable program code embodied thereon. Any combination of one or more computer readable media may be used. The computer readable media may be a computer readable signal medium or a computer readable storage medium. For example, a computer readable storage medium may be, but need not be limited to, an electronic, magnetic, optical, electromagnetic, or semiconductor system, apparatus, or device, or any suitable combination of the foregoing. Other examples of computer readable storage medium include, but are not limited to: a portable computer diskette, a hard disk, a random access memory ("RAM"), a read-only memory ("ROM"), an erasable programmable read-only memory ("EPROM" or Flash memory), an appropriate optical fiber with a repeater, a portable compact disc read-only memory ("CD-ROM"), an optical storage device, a magnetic storage device, or any suitable combination of the foregoing. Computer readable storage medium may comprise any tangible medium that may contain or store a program for use by or in connection with an instruction execution system, apparatus, or device. A computer readable signal medium may include a propagated data signal with computer readable program code embodied therein, for example, in baseband or as part of a carrier wave. The propagated data signal may take any of a variety of forms, including, but not limited to, electromagnetic, optical, or any suitable combination thereof. Program code embodied on a computer readable signal medium may be transmitted using any appropriate medium, including but not limited to wireless, wireline, optical fiber cable, radiofrequency ("RF"), or any suitable combination thereof.

Computer program code for carrying out operations for aspects of the systems and methods may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages.

Computer program instructions may be provided to a processor of a general purpose computer, special purpose computer, or other programmable data processing apparatus to produce a machine, such that the instructions which execute via the processor of the computer or other programmable instruction execution apparatus create a mechanism for implementing the functions/acts described herein.

In some embodiments, systems and methods of the present invention comprise a network, a simulation administrator connected to the network, and a user device connected to the network. In specific embodiments, the simulation administrator connected to the simulation database for data storage includes, for example, target data, firearm data, and environment data. In certain embodiments, the network is a local area network. In other embodiments, the network is a wide area network including, for example, the Internet, or a combination thereof. In particular embodiments, a network links a plurality of shooters in diverse simulated physical locations within a shared virtual environment. In further embodiments, a network links a diversity of shooters in diverse simulated physical locations within a shared virtual environment to one or more instructors. In certain embodiments, the shooters and one or more instructors are linked in consensual virtual reality by a network In some embodiments, the simulation administrator comprises a processor, a network interface connected to the processor, and memory connected to the processor. A simulation application is stored in the memory and executed by the processor. The simulation application comprises, for example, a ballistic solution application, and a statistics application that monitors, for example, user performance. In a further embodiment, a position application communicates with a position tracker connected to a controller to detect the position of the controller for the simulation application. A statistics application communicates with a database to retrieve relevant data and generate reports according to desired simulation criteria, such as selected firearms and cartridges, environments, target characteristics, and shooter characteristics for the simulation application. In particular embodiments, the simulation application generates and projects a ballistic solution projectile trajectory.

In some embodiments, a statistics application communicates with a database to retrieve relevant data and to generate images according to selected simulation criteria including, for example, the delay time between the shot and the impact, and diverse factors that influence projectile trajectory including, for example, information regarding external field conditions (e.g., date, time, temperature, relative humidity, target image resolution, barometric pressure, wind speed, wind direction, hemisphere, latitude, longitude, altitude), firearm information (e.g., rate and direction of barrel twist, internal barrel diameter, internal barrel caliber, and barrel length), projectile information (e.g., projectile weight, projectile diameter, projectile caliber, projectile cross-sectional density, one or more projectile ballistic coefficients (as used herein, "ballistic coefficient" is as exemplified by William Davis, American Rifleman, March, 1989, incorporated herein by reference), projectile configuration, propellant type, propellant amount, propellant potential force, primer, and muzzle velocity of the cartridge), target acquisition device and reticle information (e.g., type of reticle, power of magnification, first, second or fixed plane of function, distance between the target acquisition device and the barrel, the positional relation between the target acquisition device and the barrel, the range at which the telescopic gunsight was zeroed using a specific firearm and cartridge), information regarding the shooter (e.g., the shooter's visual acuity, visual idiosyncrasies, heart rate and rhythm, respiratory rate, blood oxygen saturation, muscle activity, brain wave activity, and number and positional coordinates of spotters assisting the shooter), and the relation between the shooter and target (e.g., the distance between the shooter and target, the speed and direction of movement of the target relative to the shooter, or shooter relative to the target (e.g., where the shooter is in a moving vehicle), the Coriolis force, the direction from true North, and the angle of the rifle barrel with respect to a line drawn perpendicularly to the force of gravity).

In some embodiments, the systems and methods comprise a program that provides shooting instructions and/or shooting calibration exercises. For example, in some embodiments, the systems and methods provide a menu and options for zeroing a simulated firearm in the virtual reality landscape (e.g., at a simulated 100 yard or a 100 meter range).

In some embodiments, the simulation application comprises information regarding external conditions in a database and/or entered by a user in response, for example, to a query. In one embodiment, data is entered into the system using any conventional input device linked to the system, such as a keyboard, mouse, touch-screen and the like. In some embodiments, preset conditions are selected from a database. In a further embodiment, a speech recognition system using a microphone and appropriate software for converting the spoken words to data is used to input data. In yet a further embodiment, cabled or wireless components from other measuring devices and sources is used to input data, for example Bluetooth components. In another embodiment, instruments for data input, for example, a Kestrel handheld device or similar handheld, weather station, laptop or desktop device, handheld global positioning system (GPS) or similar device, Leica Vector 4 rangefinder or similar device, and the like, are integrated with the computing device in such a way as to allow input data items to be made available to the ballistic program. In some embodiments, a direct connection is made between the external instruments and the calculator.

In some embodiments, the simulation application employs wind information. The information may be selected or input by a user or provided as part of a pre-set simulation (e.g., randomly selected, selected based on a level of difficulty, etc.). In some embodiments, the wind information comprises simulated wind speed (e.g., in miles per hour, meters per second, kilometers per hour, or knots per hour). In some embodiments, the wind information comprises wind direction. In certain embodiments, the virtual reality simulation application projects wind arrows comprising wind velocity, acceleration, flow (e.g., laminar, turbulent or a combination of flow), and direction in 1, 2 or 3 axes.

In some embodiments, the simulation application employs information regarding the simulated rate and direction of barrel twist (that is, right or left), barrel length, internal barrel diameter, and internal barrel caliber. Spin drift is a force exerted on a spinning body traveling through the air due to uneven air pressure at the surface of the object due to its spinning. This effect causes a baseball to curve when a pitcher imparts a spin to the baseball as he hurls it toward a batter.

In some embodiments, the simulation application employs information regarding the type of projectile being used. In some embodiments, the simulation application employs information regarding the weight of the projectile (e.g., in grains). The weight of the projectile may be stored in memory and automatically retrieved by the program when the user selects a standard, defined cartridge. In some embodiments, the simulation application employs information regarding the muzzle velocity of the projectile. Muzzle velocity (MV) is a function of the projectile's characteristics (e.g., projectile weight, shape, composition, construction, design, etc.), the kind, quality and amount propellant used in the cartridge case, and the primer. Muzzle velocity is also a function of the barrel length of the firearm, such that the longer the barrel length, the greater the muzzle velocity.

In some embodiments, the system requests or measures the shooter's eyesight acuity and idiosyncrasies, heart rate and rhythm (as measured by the electrocardiogram), respiratory rate (as measured by a spirometer, capnometer or impedance pneumography), blood oxygen saturation, muscle activity (as measured by the electromyogram), and brain wave activity (as measured by the electroencephalogram), or other physiologic variable. In some embodiments, the system provides training exercises to assist a shooter in improved shooting that takes into account the shooter's biological characteristics.

In a further embodiment, the simulation system queries the user for the number and positional coordinates of simulated or actual third person spotters. In an additional embodiment, the ballistics calculator system automatically queries other units to determine the number, location and type of third person spotters and devices. In one embodiment, the shooter and spotters use identical simulated target acquisition device reticles. The simulated target acquisition devices and reticles used by shooters and spotters may be fixed or variable power. In a preferred embodiment, the spotting information and aiming points are projected on reticles shared by the shooter and spotters. In yet another embodiment, multiple shooters and spotters share optical or electronically linked simulated target acquisition devices and reticles.

In some embodiments, the simulation application employs information regarding the range or distance from the shooter to the simulated target. For example, the shooter may enter a distance estimated by reference to a rangefinder on the reticle. In a further embodiment, the distance from the shooter to the target is provided by a peripheral device, for example a simulated laser rangefinder. In another embodiment, the distance from the shooter to the target is provided by actual or simulated spotters assisting the shooter, by the use of a topographic map, or by triangulation. In other embodiments, the virtual reality simulation application of the present invention comprises images and data derived from real world landscapes obtained from, for example, Google Earth, drone images, satellite images and the like, that prepare the shooter for conditions and circumstances to be encountered at a remote site (e.g., simulated training for a future real life shooting scenario).

In some embodiments, the simulation application employs slope information if any, that is, the angle from 0 to 90 degrees up or down between the shooter and the simulated target, that is, the vertical angle when the shooter is shooting uphill or downhill. This information is used to adjust the downrange aiming point based on the projectile's flight through space from the point of firing to target. As can be appreciated, the distance to a target at a sloped angle is somewhat longer than the horizontal distance to a target the same distance from the shooter at the same level, and typically requires the shooter to raise or lower the barrel of the firearm relative to an axis perpendicular to the force of gravity. A shooter aiming downhill lowers the barrel relative to the perpendicular axis forming an angle which is the "downhill" angle. As will be understood, when the shooter raises the barrel above the perpendicular axis (for example, when shooting at a target located above the shooter), the angle formed between the perpendicular axis and the barrel will be an "uphill" angle. In some embodiments, the simulation program provides cant information.

In one embodiment, for long range shooting (e.g., from 1000 to 3000 yards or more), the simulation application employs information for the Coriolis effect and spin drift. The Coriolis effect is caused by the rotation of the earth. The Coriolis effect is an inertial force described by the 19th-century French engineer-mathematician Gustave-Gaspard Coriolis in 1835. Coriolis showed that, if the ordinary Newtonian laws of motion of bodies are to be used in a rotating frame of reference, an inertial force-acting to the right of the direction of body motion for counterclockwise rotation of the reference frame or to the left for clockwise rotation must be included in the equations of motion. The effect of the Coriolis force is an apparent deflection of the path of an object that moves within a rotating coordinate system. The object does not actually deviate from its path, but it appears to do so because of the motion of the coordinate system. While the effect of the earth's movement while a bullet is in flight is negligible for short and medium range shots, for longer range shots the Coriolis effect may cause a shooter to miss.

In some embodiments, the simulation application employs target movement information, with simulated movement relative to the shooter or, in some embodiments, simulating movement of the shooter (e.g., simulating shooting from a moving vehicle at a stationary or moving target, or running from one shooting site to another). In certain embodiments, both the target and the shooter are in motion. In some embodiments, training exercises are provided to train the shooter to accurately shoot targets moving relative to the shooter, including training to use reticle markings to estimate movement direction and speed and to efficiently target moving targets.

In some embodiments, systems and methods provide target-like movements in response to projectile strikes. In other embodiments, the simulated or actual firearm in use is configured to provide recoil, report, and muzzle movement to the user upon shooting. In certain embodiments, the simulated or real firearm is provided with, and used with, one or more simulated cartridges, or one or more magazines of cartridges.

In some embodiments, the projectile trajectory is projected before the trigger pull, after the trigger pull, or both before and after the trigger pull. In particular embodiments, the projected trajectory is modified to display the influence of individual variables alone and/or in combination on the projectile trajectory. In certain embodiments, the projected trajectory may be viewed from any perspective including, for example, from the shooter's perspective, the target's perspective, a spotter's perspective, a bystander's perspective, or an aerial or satellite perspective. In further embodiments, two or more projected trajectories may be overlaid upon one another and may be visually and mathematically compared.

In some embodiments, the systems and methods of the present application are configured for the design and testing of firearms, target acquisition devices, reticles, and methods, hardware and software that provide information regarding variables that influence projectile trajectories, and their interactions in combination. In particular, systems and methods comprising virtual reality simulation applications are provided that replicate conditions that are difficult or impossible to purposefully vary during real-life, real-time testing with live ammunition including, for example, humidity, barometric pressure and elevation.

In some embodiments, the systems and methods comprise a virtual reality simulation application that simulates low light and night time shooting with, and without, illumination of various degrees of intensity e.g., with and without visible light illumination, infrared illumination, ultraviolet light illumination, thermal illumination, and the like. In other embodiments, the simulation application of the present invention is configured to test and to compare shooting performance with different light spectra and different intensities of ambient and target illumination.

In some embodiments, the systems and methods provide a graduated marksmanship training curriculum. For example, as shown in FIG. 5, in Phase Zero, the virtual reality user acquires basic rifle marksmanship including the skills of steady positioning, aim, breath control and trigger pull.

In Phase 1, the virtual reality user acquires skills of basic scoped rifle use including estimation of bullet drop, wind deflection, lead of a moving target, spin drift, and Coriolis force.

In Phase 2, the virtual reality user acquires skills for precision shooting that account for atmospheric effects (e.g., relative humidity, altitude, barometric pressure and temperature), coordination with spotters (e.g., coordination on estimation of wind speed, target speed and target size), advanced wind skills (e.g., variable wind speed and direction, wind vector calculation), intelligent targeting skills (e.g., response to threats, attacks by apparently friendly targets, attacks to the user, and team communication), electronic hardware skills (e.g., use of weather meters, wind meters, laser range finding, Solver software applications), advanced optics skills (e.g., milling, dialing, rapid ranging, second shot correction, breaching), moving target skills (e.g., time of flight) and high angle shooting. In certain embodiments, advanced optics skills comprise virtual reality training in the use of reticles comprising one or more of the features described in one or more of U.S. Pat. Nos. 9,869, 530, 9,612,086, 9,574,850, 9,500,444, 9,459,07, 9,335,123, 9,255,771, 9,250,038, 9,068,794, 8,991,702, 8,966,806, 8,959,824, 8,905,307, 8,893,971, 8,707,608, 8,656,630, 8,353,454, 8,230,635, 8,109,029, 7,946,048, 7,937,878, 7,856,750, 7,832,137, 7,712,225, 6,681,512, 6,516,699, 6,453,595, 6,032,374, and 5,920,995, each of which is herein incorporated by reference in its entirety.

In Phase 3, the virtual reality user acquires multi-skill training comprising sniping without electronic aids, rapid engagement, hunting in virtual world settings, compensating for high wind and changing weather, and truing. As used herein, "truing" refers to calibrating the ballistics calculator and ballistics solution based on actual bullet impact data.

Figure 6:
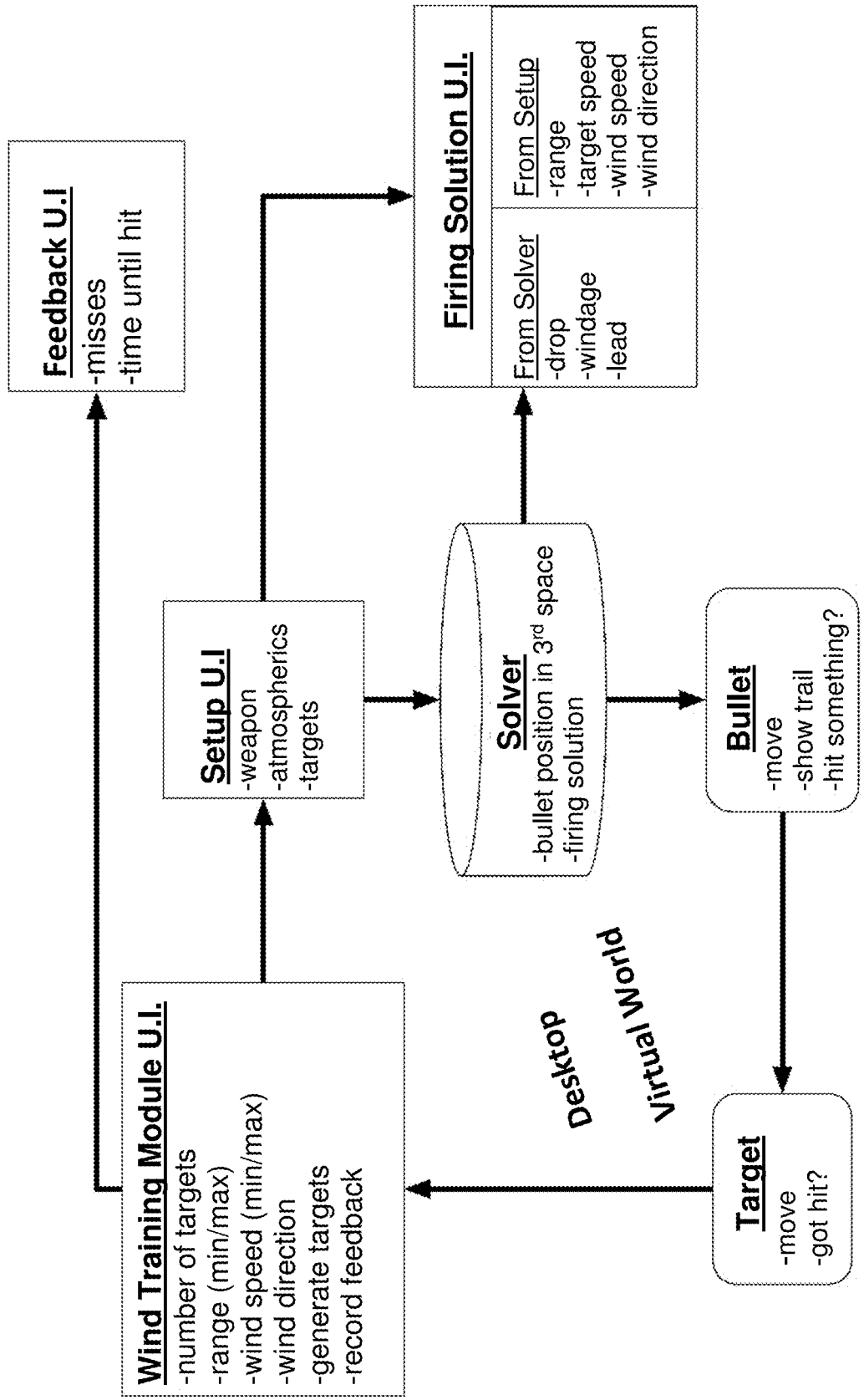
FIG. 6 shows an exemplary Virtual Reality (VR) Trainer Architecture Diagram
Figure 7:
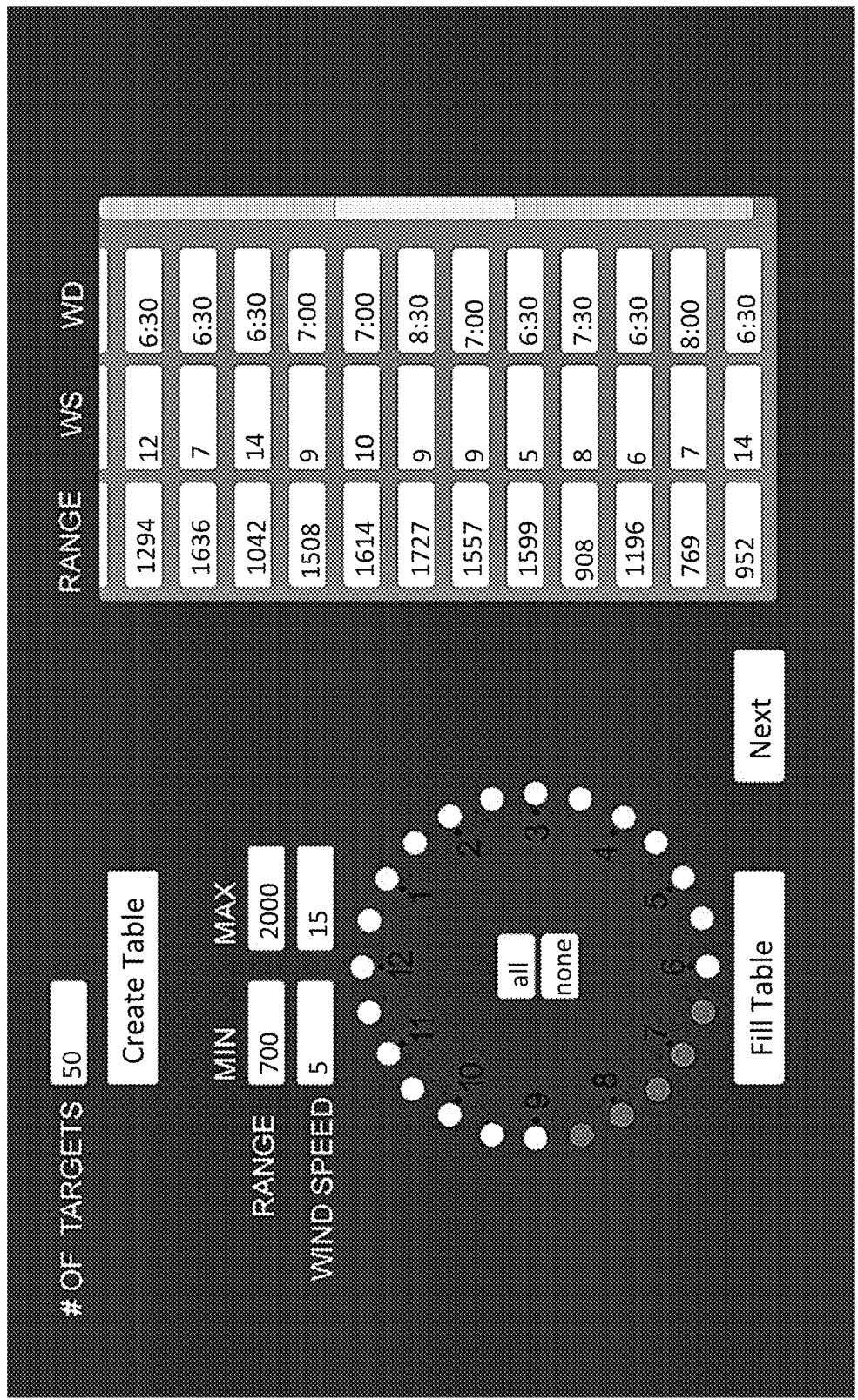
FIG. 7 shows an exemplary virtual reality training table comprising prompts for a user to design a training session comprising the number of targets desired, the minimum and maximum of ranges to targets desired, the minimum and maximum of wind speeds desired, a fill table to indicate the number of targets desired, and the range, wind speed and wind direction to each of the desired number of targets.
Figure 8:
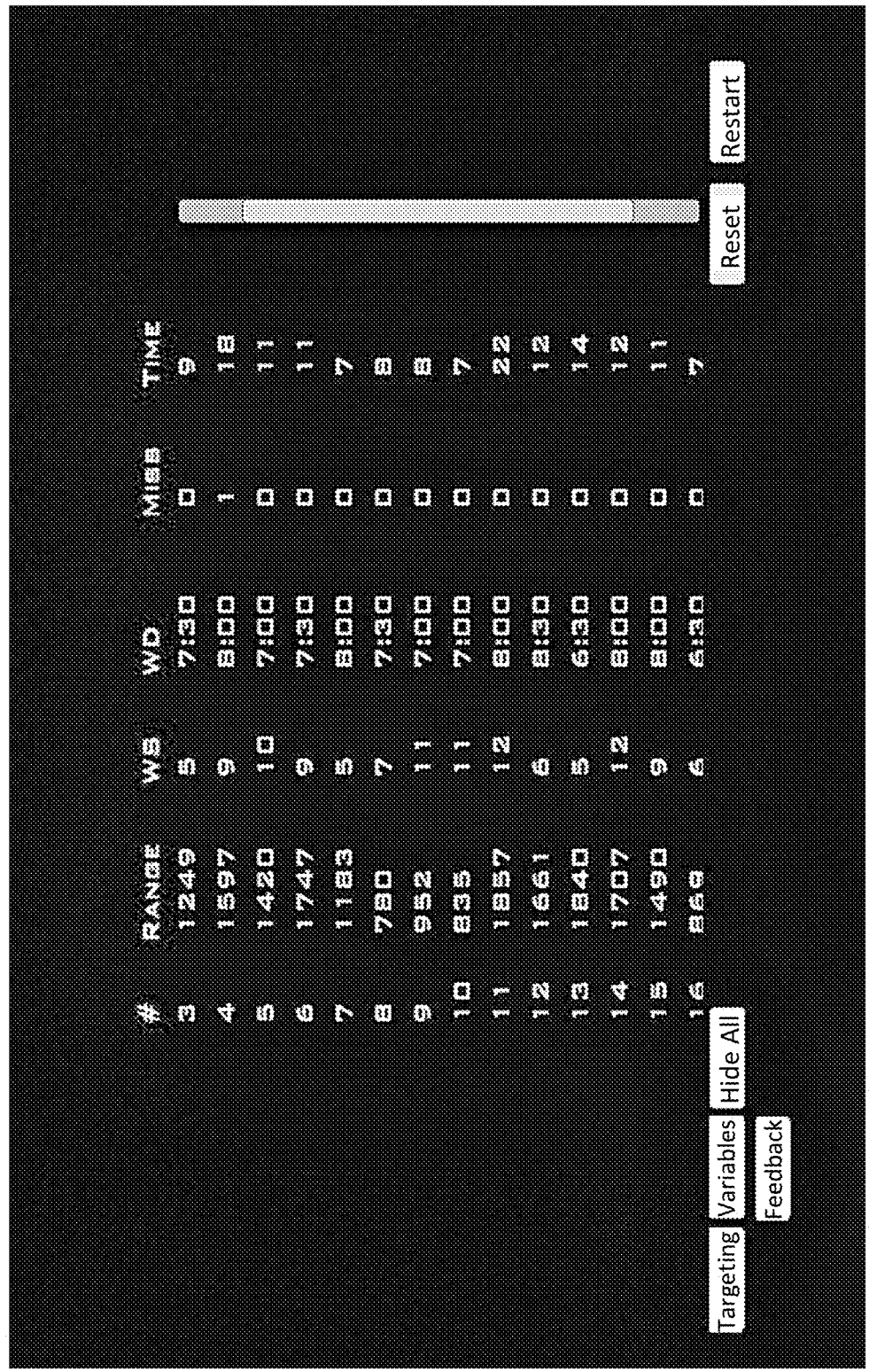
FIG. 8 shows an exemplary virtual reality feedback table comprising the number of hits and misses and the elapsed time to needed to shoot each of, for example, 16 different targets at different ranges, windspeeds and wind directions.
Figure 9:
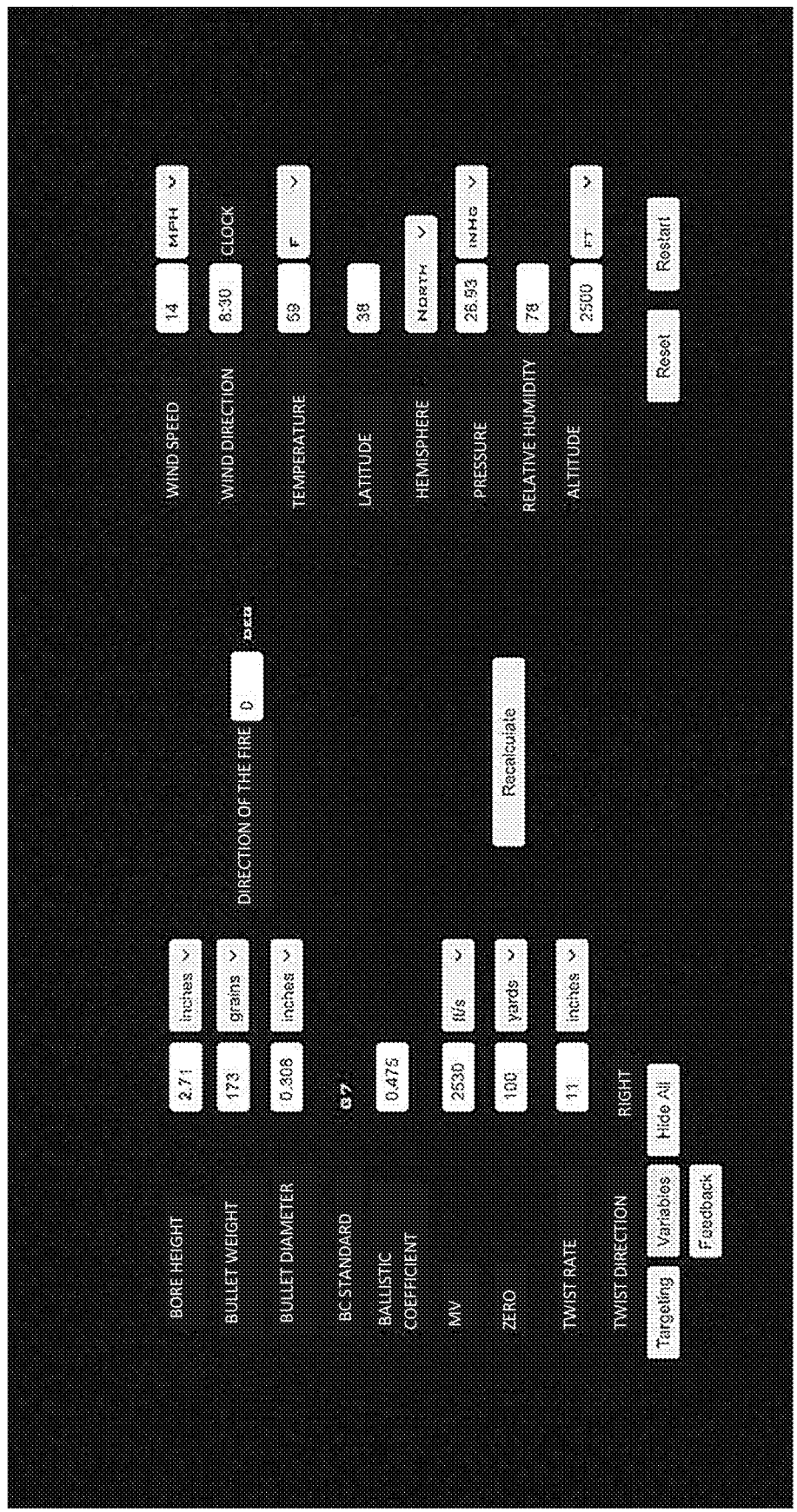
FIG. 9 shows an exemplary virtual reality training table comprising prompts for a user to enter variables for a ballistics trajectory calculator comprising the bore height of the barrel, the bullet weight, the bullet diameter, the ballistics coefficient standard, the muzzle velocity of the bullet, the zero range of the firearm and scope, the twist rate of the barrel, the twist direction of the barrel, the direction of fire, the wind speed, the wind direction, the ambient temperature, the shooter's hemisphere and latitude, the ambient air pressure, the relative humidity and the shooter's altitude.
Figure 10:
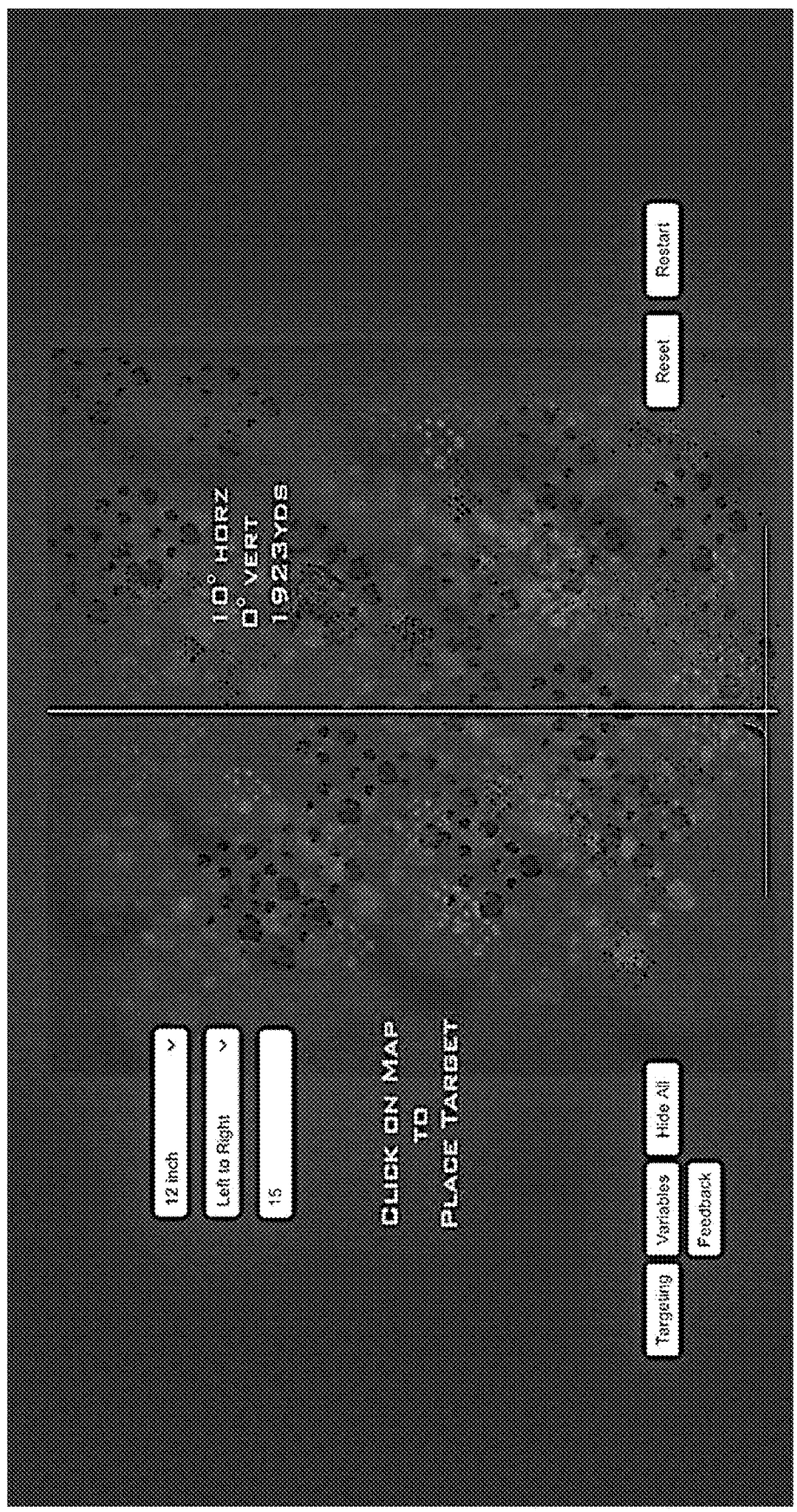
FIG. 10 shows an exemplary virtual reality training topography with prompts for a user to place training targets at desired horizontal, vertical and range loci using, for example, a click of a cursor to specific the site of one or more targets of desired dimension and orientation.

In Phase 4, the virtual reality user acquires skills for shooting in fully-integrated scenarios comprising, for example, real-world localities (e.g., rural, suburban and rural locations), real-world weather, one or more enemy combatants, one or more friendly team members and/or spotters, and hierarchical mission planning. In particular embodiments, skills are acquired in virtual reality using specific training modules integrated into specific trainer architectures as shown, for example, in FIG. 6. FIG. 6 show information and tasks relegated to a user interface (e.g., display on a desktop computer) and the virtual world. As shown in FIG. 7, the virtual reality trainee or trainer first generates a training module comprising the number of targets, ranges, wind speed and direction and coordinates of specific targets. Then wearing the virtual reality goggles and holding the virtual reality firearm, the user applies the range and windage cards projected in the user's field of view on the goggles (e.g., to the lower left of the target) to strike the target projected ahead of the user on the goggles. As shown in FIG. 8, specifics of feedback including hits vs. misses, and time until each hit are provided to the virtual reality user in the user's field of view or on another display (e.g., computing device display). As shown in FIG. 9, the trainee or trainer may further specify the relationships of the firearm, projectile, user and targets to comprise entry of data for calculation of a ballistics trajectory. In further embodiments as shown in FIG. 10, the trainee or trainee may use a cursor to specify a chosen relationship between a shooter and target on a virtual reality topographic or landscape field of view.

In some embodiments, the simulation applications, systems and methods of the present invention provide simulation and/or feedback showing the consequences of altering a single factor (e.g., wind) or combinations of factors (e.g., wind and humidity, etc.) that influence ability to hit a target to enhance learning and skill acquisition of marksmanship trainees.

In some embodiments, the simulation applications, systems and methods of the present invention provide satellite (e.g., global positioning satellite) map integration to generate, for example, a virtual reality landscape comprising import of topographic data from one or more extrinsic sources e.g., Google Maps.

In some embodiments, the simulation applications, systems and methods of the present invention support integration of radar, lidar, Doppler radar, satellite and other weather forecast data into configuration of a virtual reality.

In some embodiments, the simulation applications, systems and methods of the present invention model execution of real-world missions in advance of, during and after real-world missions.

In some embodiments of the simulation applications, systems and methods of the present invention, the virtual reality user selects a target from a menu of real-world targets (e.g., one or more combatants, wild game targets, automobiles, tanks, and the like), or symbolic targets (e.g., circles, bullseyes, grids and the like) and their dimensions, and selects their starting points, direction and speed of travel to acquire expertise in striking moving targets.

In some embodiments, the simulation applications, systems and methods of the present invention provide the trainee or trainer with options for selecting target sizes and ranges for the trainee to acquire expertise in use of ranging features on a reticle to estimate range, correct compensation for range, and to receive immediate feedback of engaging one or more virtual reality targets. In certain embodiments, the training comprises milling and mil range estimation training.

In some embodiments, the simulation applications, systems and methods of the present invention provide metrics for qualification and advancement of a virtual reality user that are specific to a user's capacities, skill set and status, and immediate in time.

In some embodiments, the simulation applications, systems and methods of the present invention provide the virtual reality shooting user with the opportunity to acquire skills in second shot correction if a first fails to strike a target, with timing and feedback to assure real-world ability in second shot correction opportunities.

In some embodiments, the simulation applications, systems and methods of the present invention provide custom training to each virtual reality trainee wherein skills that are mastered are rapidly integrated, and skills that are problematic attract increased repetition and training. In particular embodiments, tasks required for acquisition of larger skill sets may be divided into smaller skill sets comprising fewer units of information customized for each trainee.

In some embodiments, the simulation applications, systems and methods of the present invention provide the virtual reality user with training and evaluation in the acquisition of basic skills of shooting a target with a projectile, including holding an aiming point on a reticle to account for projectile drop (i.e., elevation) between a user and a target at a diversity of ranges. In certain embodiments, the aiming point firing solution for projectile drop and range is visible to the user in the field of view of the user's virtual rifle scope.

In other embodiments, the virtual reality user is provided with training and evaluation in holding an aiming point on a reticle to account for the effects of wind on a projectile. In certain embodiments, the aiming point firing solution for windage, range and projectile drop is visible to the user in the field of view of the user's virtual reality rifle scope.

In further embodiments, the virtual reality user is provided with training and evaluation in holding an aiming point on a reticle to account for the effects of target movement or "lead" in relation to the virtual shooter. In certain embodiments, the aiming point firing solution for lead, time of projectile flight, range and projectile drop is visible to the user in the field of view of the user's virtual reality rifle scope. In particular embodiments, there is no wind. In further embodiments, the target is moving perpendicular to the user at, for example, a slow and constant speed. In other embodiments, the target is moving away from the shooter.

Figure 4C:
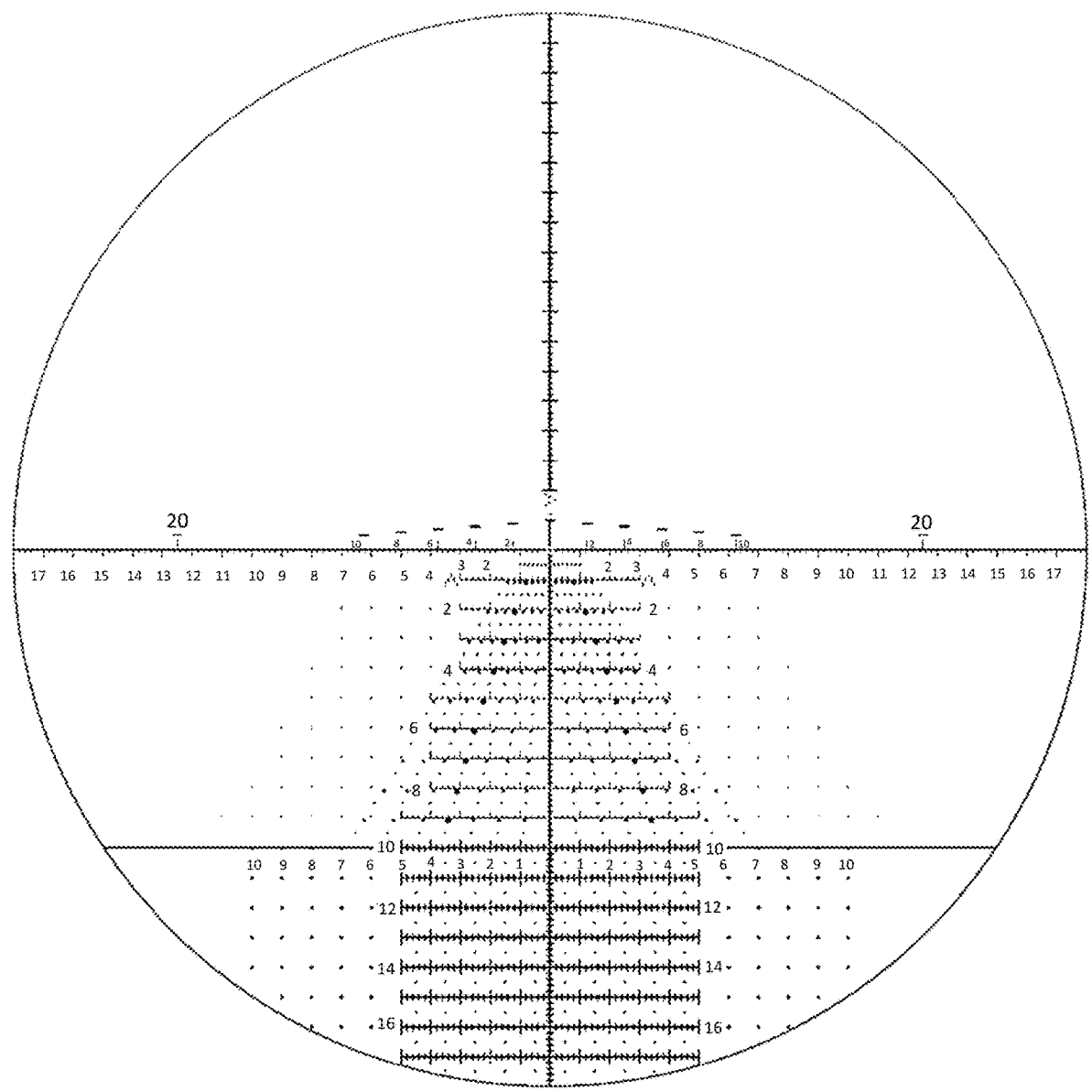

In some embodiments, the virtual reality user is provided with training and evaluation in the use of a reticle comprising wind dots including as shown, for example, in FIG. 4C. In certain embodiments, the aiming point firing solution for use of wind dots is visible to the user in the field of view of the user's virtual reality rifle scope. In another embodiment, the virtual reality user is trained and evaluated in precision shooting in diverse wind speeds and directions. In a further embodiment, the virtual reality user is trained and evaluated in the use of an information card comprising, for example, a wind dot value in miles per hour, kilometers per hour, or other indicator of wind velocity. For example, using a reticle of FIG. 4C comprising 7 time of flight (ToF) wind dots to the user's left and 7 ToF wind dots to the user's right of an intersection between a first vertical cross-hair and a second horizontal cross-hair, the user calibrates the reticle to the specific ballistics of the virtual rifle using the $4^{th}$ mil line and $2^{nd}$ wind dot. With the spin drift of a ballistics calculator disabled, the target range is manipulated until 4 mils is the desired solution. Using this elevation solution, the full wind value is manipulated until the windage solutions is as close to 0.95 mil (i.e., the sub-tension of the $2^{nd}$ wind to on the $4^{th}$ mil line) as possible. The second wind dot value is divided by 2, and the resulting value is used for all ToF wind dots. For example, 620 yards equals a 4 Mil elevation hold. A 0.95 mil wind hold equals 8 miles per hour wind value ($2^{nd}$ dot, $4^{th}$ mil line). Eight divided by 2 equals 4 miles per hour wind dot value. In still further embodiments, the wind is perpendicular to the virtual reality user.

In some embodiments, the virtual reality user is provided with training and evaluation in the acquisition of basic skills comprising milling, for example, milling 12" targets. As used herein, "milling a target" means use of a reticle as a ruler to measure a dimension of a target, then calculating the range to the target based on that measure. In specific embodiments, the target is a 12" red circle at random ranges from the virtual reality user. In further embodiments, there is no wind. In still further embodiments, there is no aiming point solution visible in the field of view of the virtual reality user's rifle scope. In particular embodiments, milling a target comprises use of an information card and rapid range bars. In exemplary reticles, rapid range bars are located above the stadia on the a first horizontal cross-hair that intersects a first vertical cross-hair, and that provide rapid and accurate range estimates to targets of known size. See, for example, FIG. 4A.

In some embodiments, the virtual reality user is provided with training and evaluation in the acquisition of basic skills comprising second shot correction if a first shot fails to strike an intended target. For example, in second shot correction the point of impact of a missed target is observed on a grid pattern of a reticle, and for a second shot that point of impact is used as an aiming point on the target. See, for example, U.S. Pat. No. 9,869,530, incorporated by reference in its entirety herein. In certain embodiments, the virtual reality user is trained and evaluated in the acquisition of basic skills when the firing solution is slightly incorrect.

In some embodiments, the simulation applications, systems and methods of the present invention provide the virtual reality user with training and evaluation in the acquisition of intermediate skills of shooting a target with a projectile. In specific embodiments, the virtual reality user is trained and evaluated in the use of wind cosine that converts the angle of wind direction in degrees to a cosine value i.e., the virtual reality user is trained and evaluated in the use of the cosine of the wind direction to accurately account for the force of the wind perpendicular to the direction of fire towards a target. In certain embodiments, no aiming point solution for wind cosine is visible in the field of view of the virtual reality user's rifle scope. In other embodiment, the virtual reality user is trained and evaluated in the use of wind cosine information cards comprising full wind values, cosine values, ranges, projectile drops and wind dot values, for example, wind dot values in the reticle of FIG. 4C. In further embodiments, the virtual reality user is trained and evaluated in the use of a wind clock that depicts wind speed and wind direction.

In some embodiments, the virtual reality user is trained and evaluated in the intermediate skill of accounting for projectile time of flight. In certain embodiments, a firing solution comprising range, projectile drop and time of flight is visible to the virtual reality user in the field of view of the virtual reality rifle scope. In other embodiments, a target clock depicts target speed and direction of movement. In particular embodiments, one or more targets move perpendicular to the virtual reality user at, for example, a slow and constant speed of travel.

In some embodiments, the virtual reality user is trained and evaluated in the intermediate skill of milling or estimating range to diverse objects including, for example, tires, windows, doors and the like. In certain embodiments, the diverse objects are of known dimension including, for example, objects of 18", 20", 24" and the like. In other embodiments, the virtual reality user is trained and evaluated in the use of information cards that provide the sizes and dimension of diverse objects. In particular embodiments, the virtual reality user is trained and evaluated in the intermediate skill of milling and striking a target when there is no wind.

In some embodiments, the virtual reality user is trained and evaluated in the intermediate skill of rapid range-finding, including, for example, 9 gun vs. 10 gun rapid range-finding. In particular embodiments, the user is provided with an image of, for example, a TREMOR reticle that depicts boxes and arrows linking one or more rapid range bars with projectile drop along a vertical cross-hair. In other embodiments, using a 0.1 mil incremental marking staircase above a TREMOR reticle primary horizontal cross-hair, the virtual reality user rapidly establishes an elevation hold for a target at a known size at a specific distance. In some embodiments, the markings are provided at 0.1 mil increments ranging from 0.5 mil furthest from the intersection of the primary horizontal cross-hair and primary vertical cross-hair to 1.0 mil above the intersection of the primary horizontal cross-hair and primary vertical cross-hair. Using a target known to be 12" in diameter, the virtual reality user places the target between the primary horizontal cross-hair or stadia, and the range marking or range bar to achieve a best fit. Using the "rule of 10" for a "10 gun" system, the virtual reality user consults a table that provides the estimated range elevation hold for each range of a 7.62×51 (0.308) projectile: for 381 meters, 2 mil drop; for 435 meters, 3 mil drop; for 508 meters, 4 mil drop; and for 610 meters, 5 mil drop; For example, if a 12" target fits best between a primary cross-hair and the 0.7 mil range bar or marking, the distance is 435 meters. Using a "rule of 10", the virtual reality user then removes the decimal such that 0.7 becomes a value of 7, and is entered into the equation: 7+X=10, wherein the elevation hold is 3 i.e., 3 mils. In particular embodiment, for a "10 gun" lead hold value below a rapid range bar form the 0.8 mil rapid range bar 4 miles per hour lead hold, dividing the corresponding miles per hour value may be divided by 2. For example, for a 12" target that best fits between a 0.7 mil range rapid range bar with a corresponding 6 miles per hour lead hold below the 0.7 mil rapid range bar, the elevation hold is 6 divided by 2=3 mil elevation hold.

In some embodiments, the simulation applications, systems and methods of the present invention provide the virtual reality user with training and evaluation in the acquisition of single variable skills in shooting a target with a projectile. In certain embodiments, the single variable is variable wind. In particular embodiments, the virtual reality is trained and evaluated in the effects of frequent changes in wind velocity and direction, and wind that gusts, on a projectile. In other embodiments, a wind clock is provided in the field of view of the virtual reality user's rifle scope. In further embodiments, the virtual reality user is trained and evaluated in the use of an information card comprising wind values of velocity and direction, wind cosine values, ranges, projectile drops and TREMOR reticle wind dot values. In particular embodiments, the virtual reality user is trained in wind cosine to strike a target in the presence of wind arising from all directions, and/or from multiple directions between a virtual target and a virtual reality shooter.

In some embodiments, the single variable is variable target movement. In certain embodiments, the target rapidly changes speed and direction of travel e.g., over seconds to minutes. In other embodiments, the virtual reality user is trained and evaluated in the use of a target movement clock in the field of view of the virtual reality user's rifle scope. In particular embodiments, there is no wind. In further embodiments, the user is trained and evaluated in the use of information cards comprising range, projectile drop and time of flight to a moving target.

In some embodiments, the simulation applications, systems and methods of the present invention provide the virtual reality user with training and evaluation in the acquisition of skills in which two or more variables must be accounted for in striking an intended target with a projectile. In certain embodiments, target movement is constant, and wind velocity and/or direction are constant. In other embodiments, target movement is constant, and wind velocity and/or direction are variable. In further embodiments, target movement is variable, and wind velocity and/or direction are constant. In still further embodiments, target movement is variable, and wind velocity and direction are variable. In specific embodiments, the virtual reality user is provided with an aiming point solution that is visible in the field of view of the virtual reality user's virtual rifle scope comprising target movement, wind velocity and direction, range, projectile drop and time of flight.

In some embodiments, the simulation applications, systems and methods of the present invention provide the virtual reality user with training and evaluation in the acquisition of military skills of shooting a target with a projectile. In specific embodiments, the virtual reality user is trained and evaluated in the milling or range estimation of human targets at diverse ranges. In other embodiments, the human targets move, walk, run, gesture or change posture. In further embodiments, no aiming point solution is provided to the virtual reality user in the field of view of the virtual reality user's rifle scope. In still further embodiments, the virtual reality user is trained and evaluated in the use of an information card comprising, for example, milling a 12" target on diverse human targets.

In some embodiments, the virtual reality user is trained and evaluated in the military skill of combat second shot correction. In other embodiments, the virtual reality user is trained and evaluated in second shot correction in the presence of, for example, variable wind, and in a dense, urban environment. In certain embodiments, the virtual reality user is trained and evaluated in second shot correction in targeting human targets that run, seek cover, attack the virtual reality user, and the like.

In some embodiments, the simulation applications, systems and methods of the present invention provide the virtual reality user with training and evaluation in the acquisition of final test skills of shooting a target with a projectile. In certain embodiments, the virtual reality user is trained and evaluated in second shot targeting of the head of a moving, human target. In specific embodiments, the target range is 400 meters to 700 meters. In other embodiments, no aiming point solution is visible to the virtual reality user in the field of view of the virtual reality user's virtual rifle scope. In further embodiments, final test skills comprise use of a range card adjacent to the user. In still further embodiments, the final test skills comprise second shot accuracy at a target enemy in variable wind. In particular embodiments, final test skills comprise striking a target enemy with a first shot.

In some embodiments, the simulation applications, systems and methods of the present invention provide the virtual reality user with training and evaluation in the acquisition of extreme long range shooting a target with a projectile. In certain embodiments, the virtual reality user is provided with a range card comprising a comprehensive aiming solution. In particular embodiments, the target range is 1000 meters to 2000 meters or greater. In other embodiments, a comprehensive aiming solution corrects for variations in the Coriolis force based on the virtual reality user's and target's geographic locations. In specific embodiments, the virtual reality user is trained and evaluated in extreme long range shooting, comprising training and evaluation in dialing comprising simulation of dialing turrets on a target acquisition device to account for the vertical and horizontal movement of a projectile in flight. In some embodiments, a TREMOR or similar reticle may hold, dial, or dial and hold for elevation adjustments. In particular embodiments, for extended distance engagement, a virtual reality shooter uses one or more 0.2 mil-radian subtensions on a horizontal stadia for wind holds as the wind dot values may change if the elevation value has been dialed. For example, in some embodiments a virtual reality shooter use hold for all values to 10 mil-radian of elevation and the calibrated wind dots for wind values. For targets at greater than 10 mils of hold over or elevation, the virtual reality user may dial the elevation value, and hold off wind values using a reticles 0.2 mil-radian graduation.

In some embodiments, the simulation applications, systems and methods of the present invention provide the virtual reality user with training and evaluation in the acquisition of spotter skills in shooting a target with a projectile. In given embodiments, a virtual reality user and a virtual reality spotter are in physical proximity to one another. In other embodiments, a virtual reality user and a virtual reality spotter are in simulated electronic communication with one another. In further embodiments, a virtual reality user and a virtual reality spotter are networked with one another in consensual virtual reality, or augmented consensual virtual reality. In certain embodiments, the virtual reality shooter and virtual reality spotter communicate with one another to inform, for example, the shooter with second shot correction with the input of the spotter. In particular embodiments, the virtual reality shooter and virtual reality spotter are trained and evaluated in a virtual urban environment, with targets that may appear at any location in the shooter's and spotter's fields of view, and further in the presence of non-target individuals. In specific embodiments, the virtual reality shooter and spotter are not provided with an aiming point solution in the field of view of a rifle scope and/or a spotting scope. In some embodiments, the field of view of the shooters rifle scope and/or the spotter's spotting scope comprises a visible trace of a projectile trajectory in either or both of the shooter's and spotter's perspective. In other embodiments, no projectile trajectory is visible to the shooter or to the spotter. In some embodiments, the shooter and/or the spotter view a splash and plume on projectile impact. In another embodiment, wind speed and wind direction are visible to the virtual reality spotter but not to the virtual reality shooter. In further embodiments, the virtual reality spotting scope image is visible on a second monitor with a keyboard and or mouse controls. In still further embodiments, the virtual reality spotter is unable to view the virtual reality shooter's rifle scope.

In some embodiments, the simulation applications, systems and methods of the present invention provide the virtual reality user with training and evaluation in the acquisition of customizable skills shooting a target with a projectile. In specific embodiments, the wind speed and direction are customizable by a virtual reality user. In particular embodiments, target movement speed and direction are customizable.

In some embodiments, the simulation applications, systems and methods of the present invention provide virtual reality imaging clues to wind speed including for example, perturbations of flags, vegetation, smoke and flames, water surfaces, travel of distant objects with and against the wind, mirage and the like.

In some embodiments, the simulation applications, systems and methods of the present invention provide diverse images of otherwise identical targets with varying width, height and breadth to aid in range estimations skill acquisition.

In some embodiments, the simulation applications, systems and methods of the present invention provide images of diverse orientations and dimensions of wounds to assist the virtual reality user in acquisition of skills needed to determine when additional aiming points are to be sought on the same target.

In some embodiments, the simulation applications, systems and methods of the present invention provide a virtual reality controller mounted on a firearm that comprises options for adjustment of windage/lead, elevation, parallax and/or diopter. In certain embodiments, the mounted controller further comprises a trigger adapter. In further embodiments, the virtual reality firearm and or target acquisition device is otherwise identical to a real-world firearm and/or target acquisition device that has been adapted for use in a virtual reality context.

In some embodiments, the simulation applications, systems and methods of the present invention provide virtual reality optical system (e.g., telescopic gunsight) simulation that enables the virtual reality user to adjust, for example, magnification, focus, focal distance, diopter, focal plane, zoom, and desired reticle to duplicate a physical optical system in virtual reality that parallel a real-world context. In certain embodiments, the virtual reality firearm comprises a physical, real-world scope linked to a virtual reality processor that adjusts the virtual reality optics to parallel real world adjustments, In other embodiments, the real world optical system and the virtual reality optical system are overlaid as the virtual reality users adjusts the windage and elevation of the physical (e.g., in-hand) virtual reality firearm (e.g., shoulder-mounted firearm with rifle barrel, or handgun or freestanding firearm with rifle barrel or handgun) to strike a virtual reality target.

In some embodiments, the simulation applications, systems and methods of the present invention provide a trainer and a trainee with a virtual shooting range comprising a landscape in which a trainee is assigned the task of deriving an aiming solution(s) that is scored by virtual firing of a projectile at a virtual target. In certain embodiments, the trainer and trainee share a real world locale. In other embodiments the trainer and trainee share a virtual reality locale. In further embodiments, the trainee and trainee share both a real world and virtual world locale. In particular embodiments, the trainee and trainer are in visual and auditory contact in either or both the real world and virtual reality. In further embodiments, simulation applications, systems and methods of the present invention support competition for precision shooting between individuals, teams, and teams of shooters and spotters.

In some embodiments, the simulation applications, systems and methods of the present invention comprise virtual reality targets programmed with artificial intelligence to respond appropriately to virtual projectiles including, for example, seeking shelter, creating diversions, or returning fire.

All publications and patents mentioned in the above specification are herein incorporated by reference. Various modifications and variations of the described compositions and methods of the invention will be apparent to those skilled in the art without departing from the scope and spirit of the invention. One skilled in the art will recognize at once that it would be possible to construct the present invention from a variety of materials and in a variety of different ways. Although the invention has been described in connection with specific further embodiments, it should be understood that the invention should not be unduly limited to such specific embodiments. While the further embodiments have been described in detail, and shown in the accompanying drawings, it will be evident that various further modification are possible without departing from the scope of the invention as set forth in the appended claims. Indeed, various modifications of the described modes for carrying out the invention which are obvious to those skilled in marksmanship, computers or related fields are intended to be within the scope of the following claims.

We claim:

1. A system, comprising:
   a) a controller, comprising:
   i) one or more position sensors wherein said one or more position sensors convey a position of said controller relative to a user in 3-dimensional space, wherein said one or more position sensors is worn by said user, wherein said one or more position sensors worn by said user monitors hand position and finger movement, wherein said one or more position sensors worn by said user provides tactile, vibratory, gyroscopic resistance, and firearm recoil feedback; and
   ii) a base having a shape of a firearm;
   b) a viewer comprising at least one visual interface; and
   c) a processor connected to said controller and said viewer, and software operatively connected to said processor comprising instructions that when executed by said processor cause said processor to display:
   i) a target;
   ii) a simulated landscape through which a simulated shot travels to reach said target; and
   iii) a simulated projectile flight path projected onto said simulated landscape between a position of a shooter and said target on said at least one visual interface wherein said projectile flight path is modified to display the influence of individual variables alone and in combination on said projectile flight path.

2. The system of claim 1, further comprising a user headset comprising said at least one visual interface.

3. The system of claim 2, wherein said target is a moving target.

4. The system of claim 1, further comprising a simulation application.

5. The system of claim 4, wherein said simulation application further comprises a ballistics solution application.

6. The system of claim 5, wherein said ballistic solution comprises calculation of one or more said variables of temperature, relative humidity, barometric pressure, wind speed, wind direction, hemisphere, latitude, longitude, altitude, barrel twist, internal barrel diameter, internal barrel caliber, barrel length, projectile weight, projectile diameter, projectile caliber, projectile cross-sectional density, projectile configuration, propellant type, propellant amount, propellant potential force, primer, muzzle velocity of the cartridge, reticle, power of magnification, first, second or fixed plane of function, distance between a target acquisition device and said barrel, positional relation between said target acquisition device and said barrel, range at which a telescopic gunsight was zeroed using a specific firearm and cartridge, information regarding shooter biological characteristics, distance between said shooter and target, speed and direction of movement of said target relative to said shooter, Coriolis force, direction from true North, and an angle of said barrel with respect to a line drawn perpendicularly to the force of gravity.

7. The system of claim 4, further comprising a statistics application configured to monitor user performance, wherein said statistics application is in communication with a database to retrieve relevant data and generate reports according to desired simulation firearm and cartridge, environment, target, and shooter characteristics for said simulation application.

8. The system of claim 4, further comprising a position application in communication with said one or more position sensors connected to said controller to detect a position of said controller for said simulation application.

9. The system of claim 1, further comprising a program providing shooting instructions and shooting calibration exercises.

10. The system of claim 4, wherein said system further comprises a non-transitory computer readable media comprising said instructions that when executed by said processor cause a computer to execute said shooting simulation application transmitted to said viewer.

11. The system of claim 10, wherein said non-transitory computer readable media comprises said instructions that simulate multiple targets that train and evaluate a user in progressively more complex shooting conditions.

12. The system of claim 4, further comprising a user interface that supports a user's selection of shooting conditions, views, and options.

13. The system of claim 12, wherein said user interface comprises prompts for a user to design a training session comprising a number of targets desired, minimum and maximum ranges to targets desired, and minimum and maximum wind speeds desired.

14. The system of claim 1, further comprising a network wherein said network links a plurality of shooters in a simulated physical locations within a shared virtual environment to one or more instructors.

15. The system of claim 14, further comprising one or more spotters wherein said plurality of shooters and said one or more spotters use identical simulated target acquisition devices.

16. The system of claim 1, wherein said simulated projectile flight path is viewed from a perspective selected from the group consisting of a shooter's perspective, a target's perspective, a spotter's perspective, a bystander's perspective and an aerial or satellite perspective.

17. A system, comprising:
   a) a controller, comprising:
   i) one or more position sensors wherein said one or more position sensors convey a position of said controller relative to a user in 3-dimensional space, wherein said one or more position sensors is worn by said user, wherein said one or more position sensors worn by said user monitors hand position and finger movement, wherein said one or more position sensors worn by said user provides tactile, vibratory, gyroscopic resistance, and firearm recoil feedback;
   ii a base having a shape of a firearm;
   b) a viewer comprising at least one visual interface;
   c) a processor connected to said controller and said viewer, and software operatively connected to said processor comprising instructions that when executed by said processor cause said processor to execute a shooting simulation application wherein said shooting simulation application calculates a simulated projectile flight path wherein said projectile flight path is modified to display the influence of individual variables alone and in combination on said projectile flight path;
   d) a non-transitory computer readable media comprising said instructions that when executed by said processor cause a computer to execute said shooting simulation application transmitted to said viewer; and
   e) a user interface that supports a user's selection of shooting conditions, views, and options, wherein said user interface comprises prompts for a user to design a training session comprising a number of targets desired, minimum and maximum ranges to targets desired, and minimum and maximum wind speeds desired.

18. The system of claim 17, wherein said viewer comprises a headset comprising one or more of said processor, a power source connected to said processor, memory connected to said processor, a communication interface connected to said processor, a display unit connected to said processor.

* * * * *

UNITED STATES PATENT AND TRADEMARK OFFICE
CERTIFICATE OF CORRECTION

| | |
|---|---|
| PATENT NO. | : 11,754,372 B2 |
| APPLICATION NO. | : 17/020632 |
| DATED | : September 12, 2023 |
| INVENTOR(S) | : Nathaniel P. Gallery, Klaus Johnson and Andrew McCormick |

It is certified that error appears in the above-identified patent and that said Letters Patent is hereby corrected as shown below:

In the Claims

Claim 3, Column 18, Line 64, "The system of claim 2" should read -- The system of claim 1 --

Signed and Sealed this
Twenty-seventh Day of August, 2024

Katherine Kelly Vidal
*Director of the United States Patent and Trademark Office*